US008888290B2

(12) United States Patent
Liu

(10) Patent No.: US 8,888,290 B2
(45) Date of Patent: Nov. 18, 2014

(54) POLARIZATION BEAM SPLITTERS FOR IMAGE PROJECTION APPARATUS

(75) Inventor: Ying Liu, Hong Kong (HK)

(73) Assignee: Hong Kong Applied Science and Technology Research Institute Company Limited, Hong Kong Science Park Shatin, New Territories, Hong Kong (CN)

( * ) Notice: Subject to any disclaimer, the term of this patent is extended or adjusted under 35 U.S.C. 154(b) by 309 days.

(21) Appl. No.: 13/443,896

(22) Filed: Apr. 11, 2012

(65) Prior Publication Data
US 2012/0257169 A1 Oct. 11, 2012

Related U.S. Application Data

(63) Continuation-in-part of application No. 13/233,036, filed on Sep. 15, 2011, now Pat. No. 8,482,549.

(60) Provisional application No. 61/473,165, filed on Apr. 8, 2011.

(51) Int. Cl.
| G03B 21/26 | (2006.01) |
| G06F 3/042 | (2006.01) |
| G02B 27/12 | (2006.01) |
| G03B 21/20 | (2006.01) |
| G03B 33/12 | (2006.01) |
| G03B 35/26 | (2006.01) |
| H04N 9/31 | (2006.01) |

(52) U.S. Cl.
CPC .......... *G02B 27/126* (2013.01); *G03B 21/2013* (2013.01); *G03B 33/12* (2013.01); *G03B 35/26* (2013.01); *H04N 9/3167* (2013.01)
USPC .................. 353/20; 359/640; 353/34; 353/8; 345/175

(58) Field of Classification Search
None
See application file for complete search history.

(56) References Cited

U.S. PATENT DOCUMENTS 5,764,412 A * 6/1998 Suzuki et al. ............ 359/485.03
6,275,312 B1 8/2001 Derks et al.
(Continued)

FOREIGN PATENT DOCUMENTS

CN 1721916 A 1/2006
CN 101233442 A 7/2008
(Continued)

OTHER PUBLICATIONS

Office Action issued from the State Intellectual Property Office of the People's Republic of China on Jan. 13, 2014.
(Continued)

*Primary Examiner* — Jason Olson
(74) *Attorney, Agent, or Firm* — Ella Cheong Hong Kong; Sam T. Yip

(57) ABSTRACT

A polarization beam splitter includes at least six prisms assembled together to form a single solid components. At least one diagonal interface is formed by a combination of two or more prism surfaces. The solid polarization beam splitter component has at least four light entrance/exit surfaces with at least one of the light entrance/exit surfaces including a step. At least one of the prisms has a non-triangular cross-sectional shape. At least one surface of a prism that forms a portion of the diagonal interface has a polarization beam splitting material disposed thereon resulting in a diagonal interface that includes a polarization beam splitting material. The polarization beam splitter can be incorporated into various image projection apparatus including 2D, multiple image, and 3D projection apparatuses.

16 Claims, 7 Drawing Sheets

(56) References Cited

U.S. PATENT DOCUMENTS

| | | |
|---|---|---|
| 6,280,034 B1 | 8/2001 | Brennesholtz |
| 7,213,922 B2 * | 5/2007 | Suzuki et al. ............ 353/31 |
| 7,529,029 B2 | 5/2009 | Duncan et al. |
| 7,690,794 B2 | 4/2010 | Boothroyd |
| 2002/0109820 A1 | 8/2002 | Pan |
| 2006/0244920 A1 | 11/2006 | Kawaai |
| 2006/0274274 A1 | 12/2006 | Adachi et al. |
| 2007/0177106 A1 | 8/2007 | McDowall et al. |
| 2011/0051093 A1 * | 3/2011 | Qu ............................ 353/20 |
| 2012/0162608 A1 * | 6/2012 | Eguchi ........................ 353/7 |

FOREIGN PATENT DOCUMENTS

| | | |
|---|---|---|
| CN | 201203713 Y | 3/2009 |
| CN | 101881891 A | 11/2010 |
| CN | 102325242 A | 1/2012 |
| JP | 2006301338 A | 11/2006 |
| WO | 2004064411 A1 | 7/2004 |

OTHER PUBLICATIONS

Office Action issued from the State Intellectual Property Office of the People's Republic of China on Jul. 23, 2014.

* cited by examiner

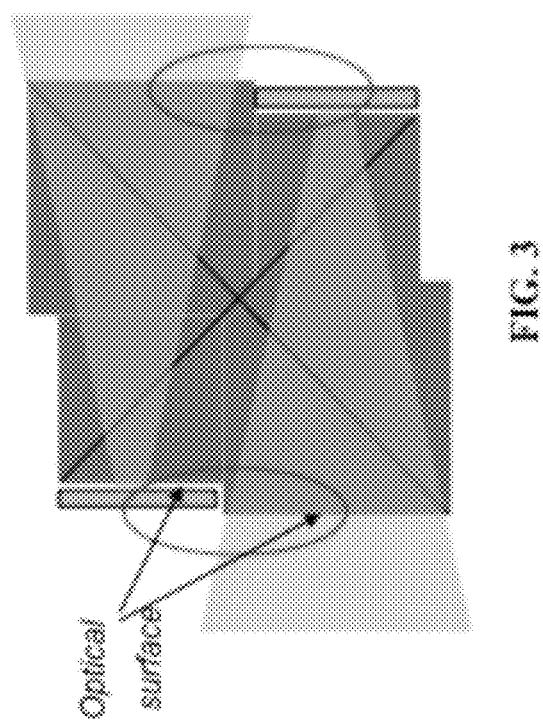

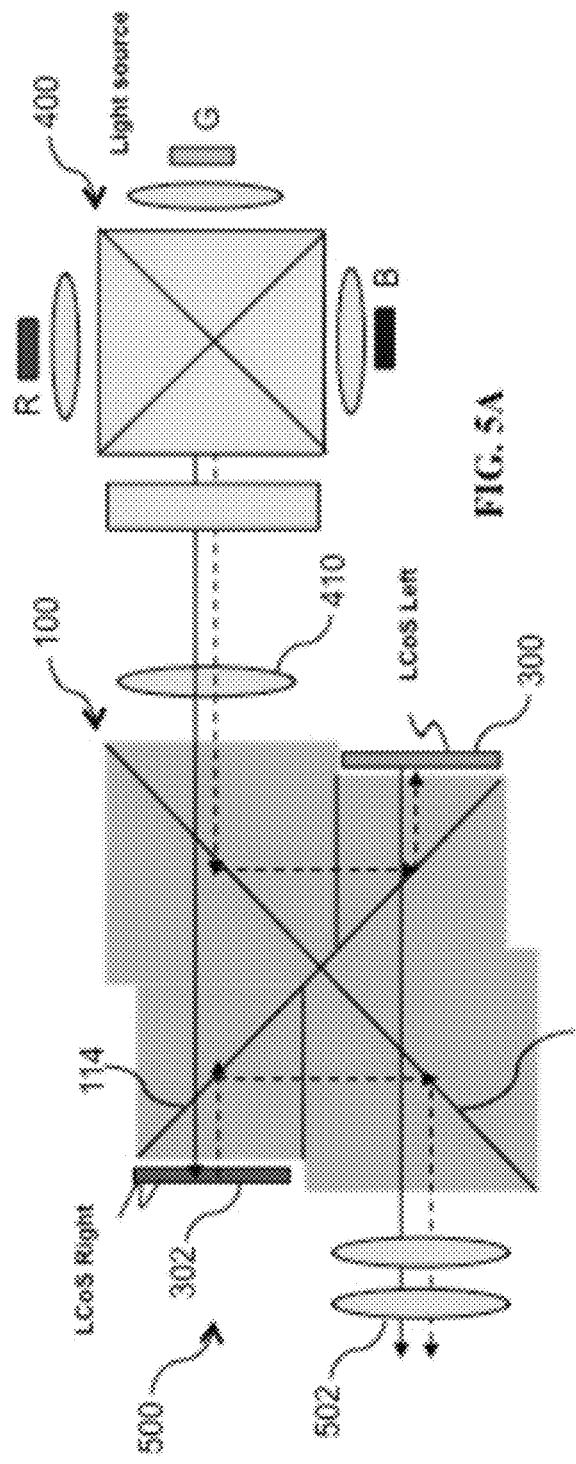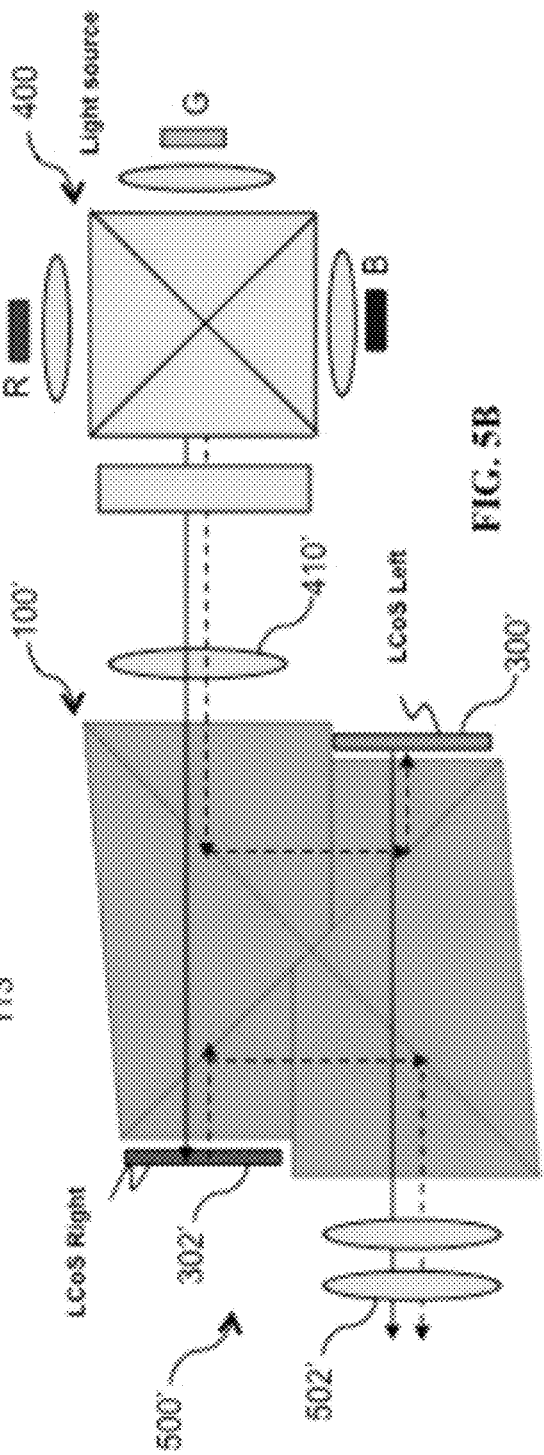
FIG. 5A
FIG. 5B

POLARIZATION BEAM SPLITTERS FOR IMAGE PROJECTION APPARATUS

CROSS-REFERENCE TO RELATED APPLICATIONS

This application claims priority from U.S. Provisional Patent Application 61/473,165 filed 8 Apr. 2011, and U.S. patent application Ser. No. 13/233,036 filed 15 Sep. 2011 the disclosures of which are incorporated by reference herein.

TECHNICAL FIELD

The present invention relates to polarization beam splitters in general and, more particularly, to polarization beam splitters for use in projection apparatus that can produce multiple images and/or three-dimensional images.

BACKGROUND

There are many applications in which multiple images must be displayed either sequentially or simultaneously. Current apparatus which can project multiple images are bulky, usually being complete duplicates of single-image projection apparatus. Typically, multiple light sources are required.

However, there is a need in the art for compact projection apparatus which can project multiple images, in which the multiple images each optionally display different image information. Such a projector could be used for wide-screen projection, three-dimensional image creation, and interactive imaging applications.

Polarization beam splitters for such projection apparatus must also be compact. In addition to being compact, the PBS structures must be easy to fabricate since machining of small optical components greatly increases their expense. Thus there is a need in the art for improved polarization beam splitters which are compact and easy to fabricate. Such polarization beam splitters can be used in compact image projection apparatus.

FIGS. 2A-2C depict polarization beam splitters with two LCoS spatial light modulators. The polarization beam splitter needs to have the same vertical and horizontal lengths. However, light has a certain cone angle; the longer the length, the bigger the cone will be. As seen in FIG. 2B, there is significant light leakage from the polarization beam splitter. This leakage will cause an undesirable ghost image due to total internal reflection. Thus it is necessary, for this design, to either enlarge the size of the PBS or control the light solid angle. Further, as seen in FIG. 2C, there are large regions (indicated in part by the oval shapes) of the PBS that are unused by the light emitted from the spatial light modulator, making the device inefficient.

As seen in FIG. 3, a more efficient polarization beam splitter with less light leakage and greater PBS volume utilization can be created using stepped optical surfaces adjacent to the spatial light modulators (as well as stepped surfaces on the top and bottom PBS surfaces). While such a design advantageously reduces size, improves brightness, and improves contrast, fabrication is difficult, particularly for the precision machining of the stepped optical surfaces.

Thus, there remains a need in the art for improved polarization beam splitters that are compact, have high brightness and contrast, and are simple and cost-effective to fabricate.

SUMMARY OF THE INVENTION

In one aspect, the invention comprises a polarization beam splitter that includes at least six prisms assembled together to form a single solid component. At least one diagonal interface is formed by a combination of two or more prism surfaces. The solid polarization beam splitter component has at least four light entrance/exit surfaces with at least two of the light entrance/exit surfaces forming a step. At least one of the prisms has a non-triangular cross-sectional shape. At least one surface of a prism that forms a portion of the diagonal interface has a polarization beam splitting material disposed thereon resulting in a diagonal interface that includes a polarization beam splitting material.

In one embodiment, the present invention is directed to a projection apparatus that has at least a first light source for providing light that includes the polarization beam splitter described above. Image forming light modulators, such as LCoS spatial light modulators, are provided adjacent the multi-prism beam splitter. Projectors that form a single image or two images can be created using the polarization beam splitters of the present invention.

In another projector embodiment for forming two images, first and second LCoS spatial light modulators and a first light source are configured such that the first LCoS spatial light modulator and the first light source are positioned adjacent one side of the polarization beam splitter and the second LCoS spatial light modulator and the second projection optics system share an opposite-facing side of the polarization beam splitter. In this configuration, light from the first light source is formed into first and second polarized beams that are directed in orthogonal directions by the polarization beam splitter such that the first polarized beam is directed into the first LCoS spatial light modulator and the second polarized beam is directed into the second LCoS spatial light modulator.

A first image source modulates the first LCoS spatial light modulator and a second image source for producing images which may be the same or different from images produced using the first image source, modulates the second LCoS spatial light modulator. The first and second LCoS spatial light modulators and the first and second projection optics systems are configured such that a first modulated reflected output image from the first LCoS spatial light modulator is output to the first projection optics system and a second modulated reflected output image from the second LCoS spatial light modulator output to the second projection optics system.

BRIEF DESCRIPTION OF THE DRAWINGS

FIG. 3 depicts light passing through a modified/stepped polarization beam splitter with two spatial light modulators.

FIGS. 5A and 5B depict an image projection system using the polarization beam splitters of the present invention to form a single 2-D or 3-D image.

DETAILED DESCRIPTION OF THE INVENTION

Figure 1B:
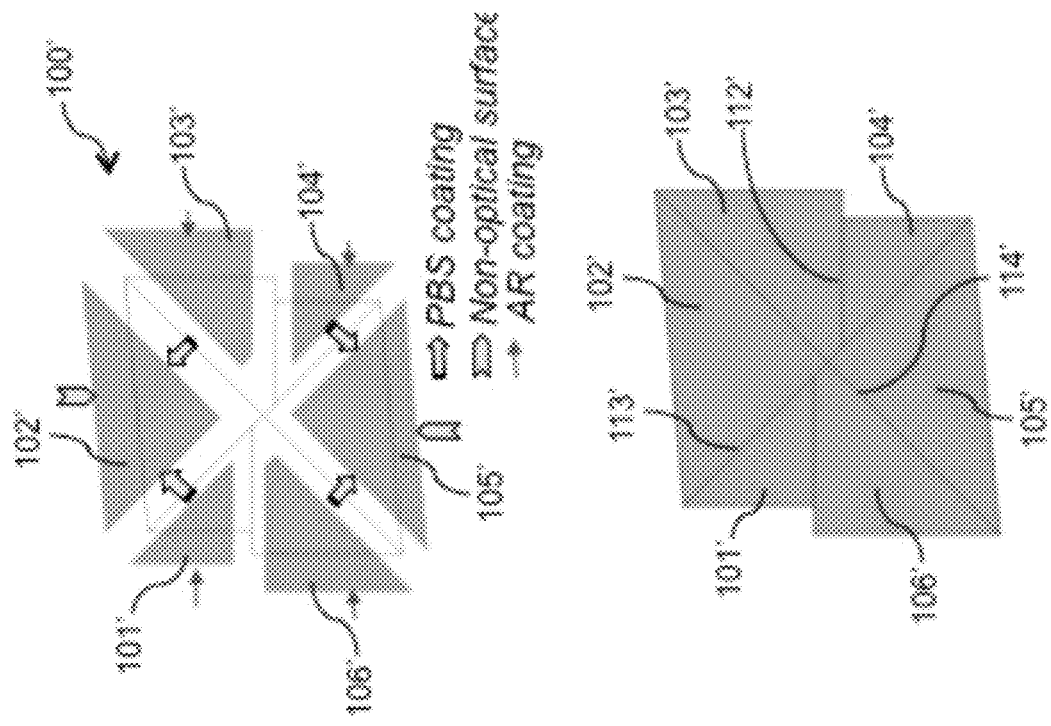
FIGS. 1A-1C depict polarization beam splitter configurations of the present invention.
Figure 1A:
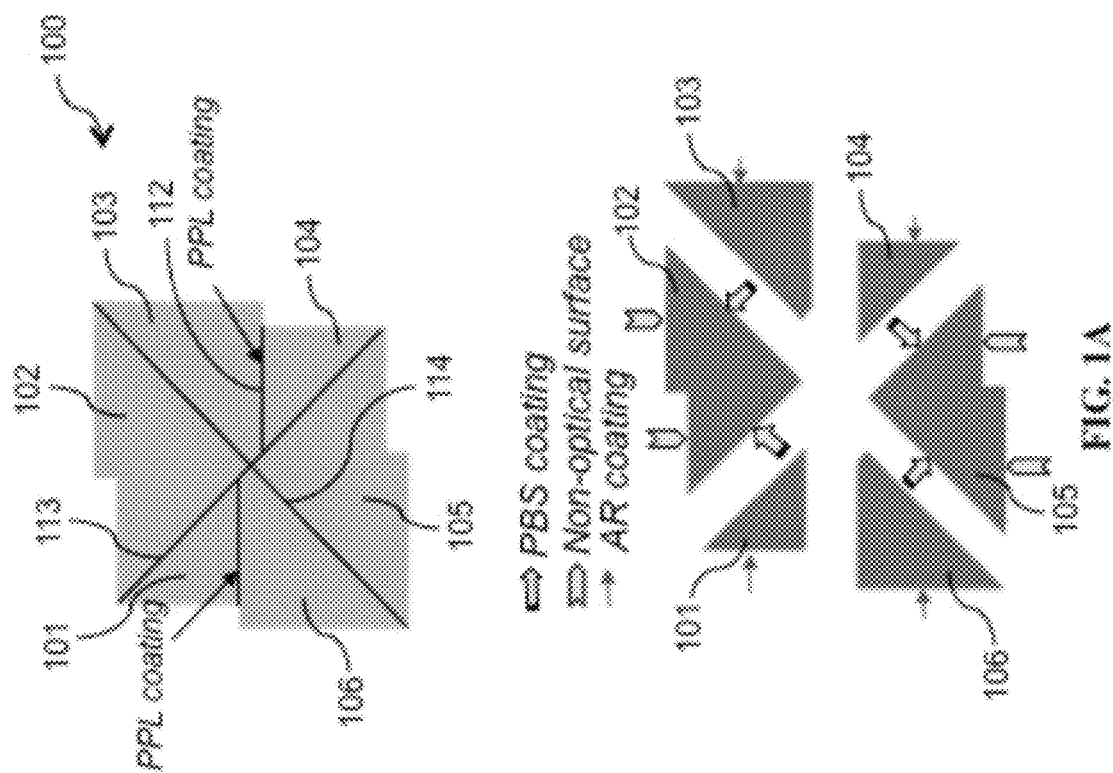
Figure 1C:
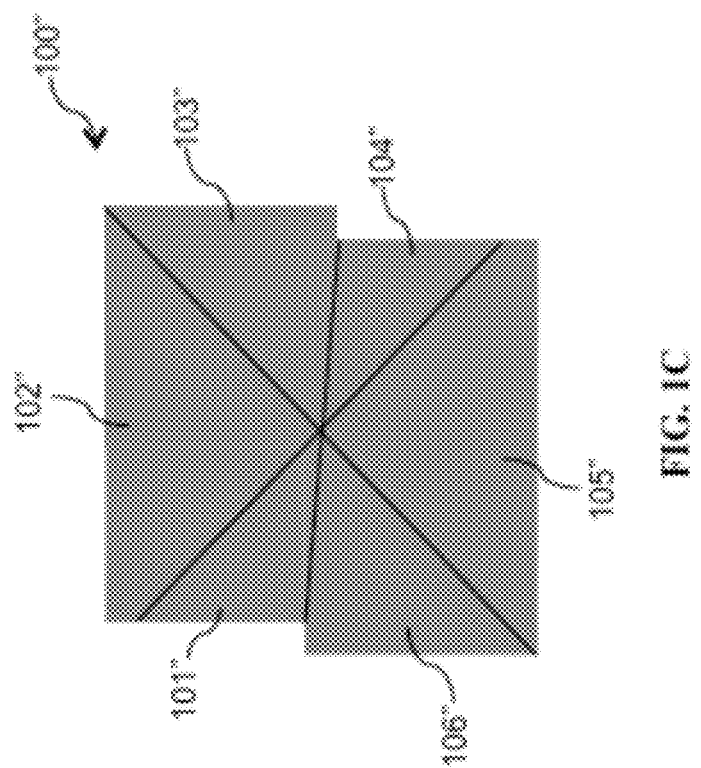
Figure 2A:
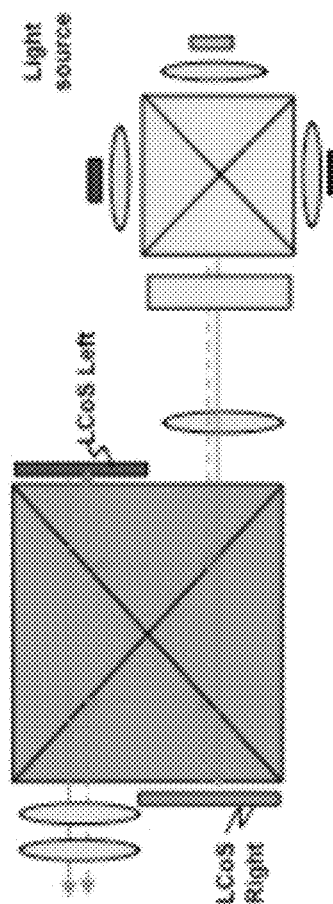
FIGS. 2A-2C depict light passing through polarization beam splitters with two spatial light modulators.
Figure 2C:
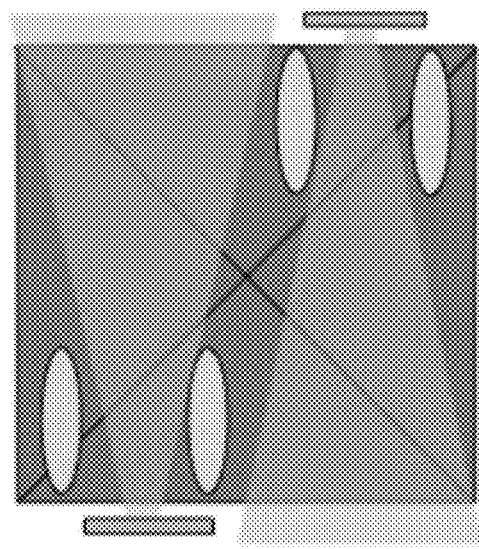
Figure 2B:
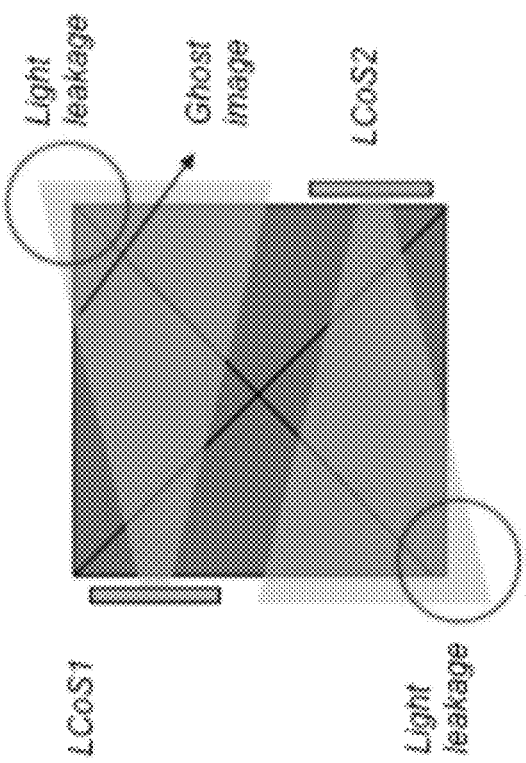

Turning to the drawings in detail, FIGS. 1A-1C depict polarization beam splitter structures of the present invention.

As seen in FIG. 1A, each polarization beam splitter includes six prisms 101, 102, 103, 104, 105, and 106. The six prisms are cemented together to form an integrated polarization beam splitter 100. A surface coating 112 or other beamsplitting element is formed on one or more facets of each prism 101, 102, 103, 104, 105, and 106 that faces another prism facet; the elements are selected such that when the six prisms are assembled, the surfaces form a pair of orthogonal surfaces 113 and 114 of prism 100. The surface 113 is formed by facets of 101, 102, 103, 104, 105 and 106, the surface 114 is formed by facets of 102, 103, 105 and 106.

In one embodiment, both orthogonal surfaces 113 and 114 include a polarization beam splitting material or coating; alternatively, the polarization beam splitting coating can be formed on portions of the orthogonal surfaces with one or more portions including a mirror coating (for certain imaging applications to be discussed below). The polarization beam splitting material includes coatings, gratings, etc. such that two orthogonal diagonal beam splitter surfaces are created. Optionally, a grating micro structure or MOF film can also be attached between the two orthogonal surfaces 113 and 114 to be used as the polarization beam splitter element rather than a PBS coating material. For a portion of an orthogonal surface having a mirror surface rather than a polarization beam splitter element, the mirror surface reflects incident light of any polarization in a direction 90° from the mirror surface. The mirror coating can be selected form thin film coatings such as aluminum, silver, gold, or other metal or reflective coatings. The material of the prisms is selected from glass, plastic, crystal or other optical materials.

As seen in FIG. 1A, elements 102 and 105 include a step formed in the outer surface; this surface is a non-optical surface, that is, light is not expected to enter or exit through the exterior-facing surface of prism elements 102 and 105. Further, it is noted that prisms 102 and 105 do not have triangular cross sections. Similarly, prism elements 103 and 106 also do not have triangular cross sections. For any exterior surface through which light enters or exits, an optional antireflection coating can be provided.

To avoid having to machine a step in the optical surfaces formed by the combination of prisms 103 and 104 and the combination of prisms 101 and 106, the prism sizes are selected such that, when assembled, a step is formed at the interface between the respective prisms. Further, a polarizer coating or material can be placed at the interface between prisms 103 and 104 and the interface between prisms 101 and 106 to improve the contrast ratio to be discussed below. As seen in FIG. 1A, two prisms have triangular cross sections (prisms 101 and 103) and one angle of the triangular cross section is 90 degrees while the other two acute angles are different from one another. Further, the assembled polarization beam splitter of FIG. 1A has four stepped external surfaces.

In the embodiment of FIG. 1B, the prisms 101', 102', 103', 104', 105' and 106' correspond, functionally, to prisms 101-106 of FIG. 1A. However, the geometry is different. To eliminate the step from the top and bottom non-optical surfaces, the step is replaced by a sloped diagonal in prisms 102' and 105'. Thus only prisms 103' and 106' have non-triangular cross-sectional shapes. As a result, only two of the external beam splitter surfaces are stepped surfaces. Similarly, in the embodiment of FIG. 1C, prisms 101", 102", 103", 104", 105", and 106" are configured such that a step is not used on the non-optical exterior surfaces of prisms 102" and 105" and only two exterior surfaces are stepped. However, these prisms are selected to have a non-triangular cross-section such that the resultant polarization beam splitter 100" has an overall geometry that is approximately cubic. That is the non-stepped surfaces of the polarization beam splitter are substantially planar and intersect at approximately right angles with the stepped surfaces of the polarization beam splitter.

Figure 4A:
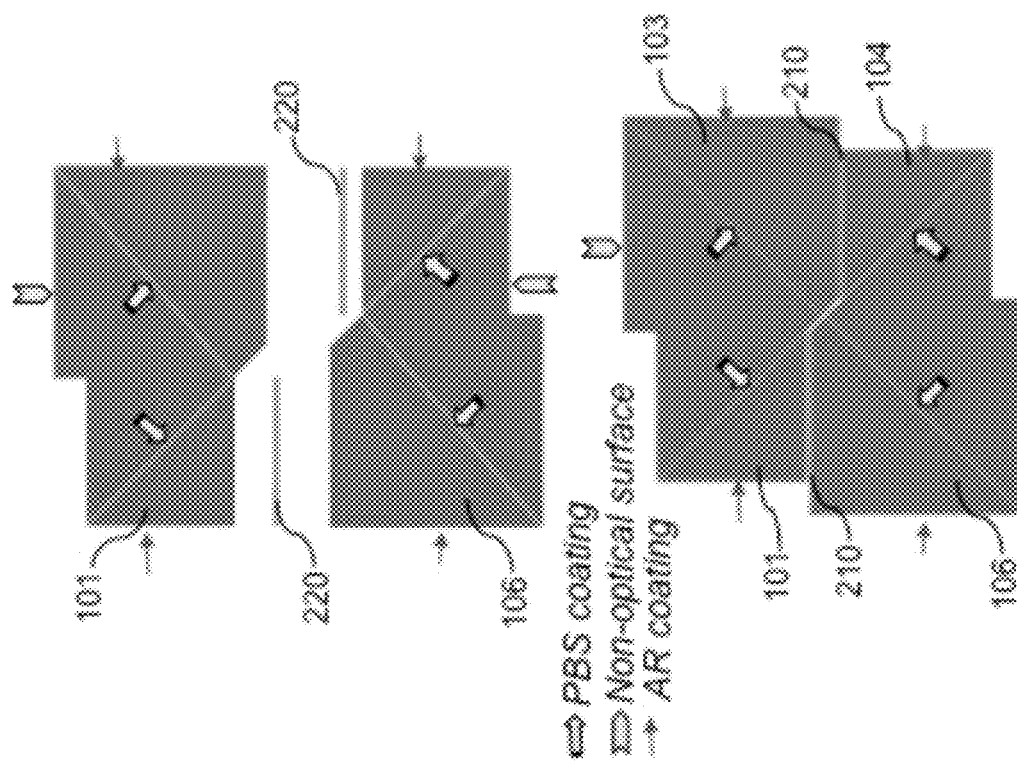
FIGS. 4A and 4B depict formation of a polarization beam splitter with either an internal PPL coating on surfaces to be adhered to one another or an internal antireflection coating on the surface of the prism if the prisms are not adhered to one another.
Figure 4B:
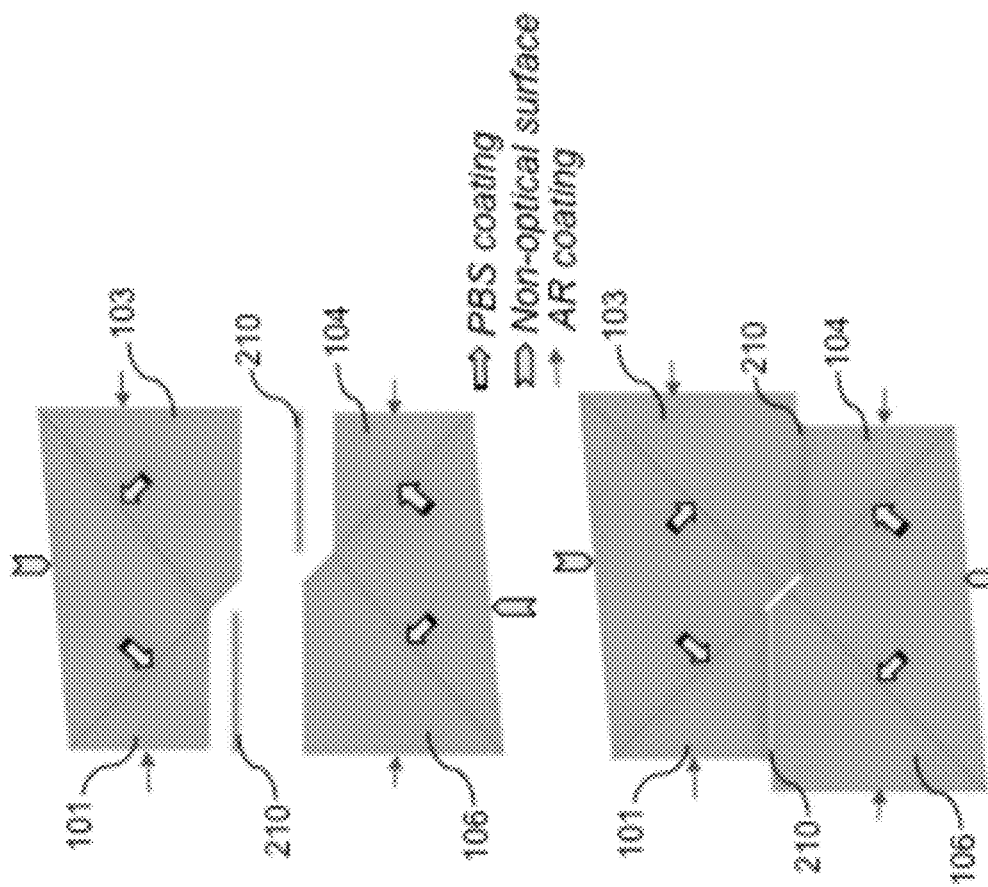

As seen in FIGS. 4A and 4B, a polarizer coating or material 210, 220 can be interposed between prism subcomponents 101 and 106 and between prism subcomponents 103 and 104 to enhance the contrast ratio. Alternatively, as seen in FIGS. 4A and 4B, an antireflection coating can be interposed on each surface in between prism subcomponents 101 and 106 and between prism subcomponents 103 and 104. Advantageously, the antireflection coating reduces undesirable light reflections at these interfaces if they are not cemented to one another.

FIGS. 5A and 5B depict projection apparatus 500 and projection apparatus 500' respectively using polarization beam splitters 100 and 101 in connection with light source 400 to form a single 2-D or 3-D image. Light source 400 is unpolarized and is incident to polarization beam splitter 100 (FIG. 5A) or 100' (FIG. 5B). The light source may be a white light source or combined or sequential colored light sources (e.g., red, blue, green LED light sources as depicted in FIGS. 5A and 5B). On the same side of polarization beam splitter 100 as light source 400 is a first reflective spatial light modulator 300. In an exemplary embodiment, reflective spatial light modulator 300 is a liquid crystal on silicon (LCoS) modulator; however, any low profile reflective spatial light modulator that can be positioned adjacent the polarization beam splitters of the present invention can be used in the projection apparatus 500, 500' of the present invention. Exemplary spatial light modulators (for all of the embodiments of the present invention) include, but are not limited to the liquid crystal on silicon spatial light modulators, digital micromirror device spatial light modulators, digital light processor spatial light modulators, MEMS spatial light modulators, liquid crystal spatial light modulators, mirror-based spatial light modulators, or any other low profile spatial light modulator that can process image information for projection. Note that the spatial light modulators in any projector may be the same kind of spatial light modulator or two or more kinds of spatial light modulators, depending upon the projector application.

On an opposite polarization beam splitter surface, in line with incident light source 400, is a second reflective spatial light modulator 302; again, in this embodiment a LCoS spatial light modulator is depicted as light modulator 302 but other reflective spatial light modulators can be selected. Incident light from source 400 passes through incident light source optics 410 and enters the polarization beam splitter 100. When the light reaches the polarization beam splitter coated diagonal interface 113, light of one polarization passes through polarization beam splitter 100 in a straight line and is incident on second reflective spatial light modulator 302. Light of the opposite polarization is reflected by the polarization beam splitter surface 113 and is again reflected by polarization beam splitter surface 114 into first spatial light modulator 300. In the embodiment of FIG. 5A, a straight line indicates P-polarized light while a dashed line indicates S-polarized light. However, the opposite configuration can also be used (with P and S polarization light reversed) depending upon the selected beamsplitter element.

Modulated light of the opposite polarization is reflected by each reflective spatial light modulator 300, 302. Light that exits reflective spatial light modulator 300 passes through polarization beam splitter 100 towards projection optics 502. Light that exits reflective spatial light modulator 302 is reflected by the polarization beam splitter surface 114 and is again reflected by polarization beam splitter surface 113 towards projection optics 502. In this manner, two modulated images are combined to form a single 2D image of enhanced brightness or a 3D image, depending upon the selected modulation performed by modulators 300 and 302.

In FIG. 5B, incident light from source 400 is processed in a substantially similar manner by polarization beam splitter 100' and spatial light modulators 300' and 302' to form a selected 2D or 3D image output through projection optics 502'.

Figure 6:
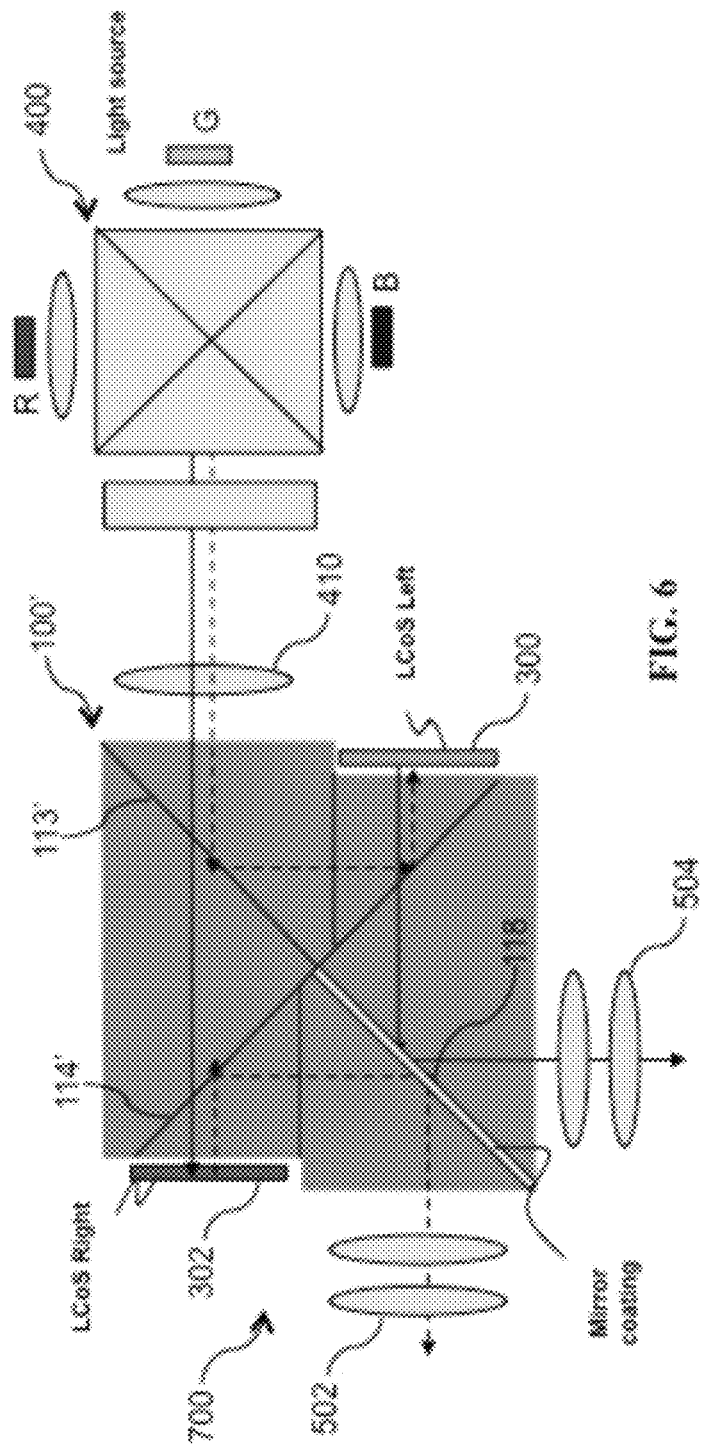
FIG. 6 depicts an image projection apparatus using the polarization beam splitters of the present invention to form two images.

In FIG. 6, an image projection apparatus 700 is formed which can project two modulated images. As in the embodiment of FIG. 5A, a light source 400 sends incident light through light source optics 410 into a polarization beam splitter 100'. Spatial light modulator 300 is positioned on the same side as the incident light surface while second spatial light modulator 302 is positioned on the opposite surface of the polarization beam splitter 100'; again, in this embodiment a LCoS spatial light modulator is depicted as light modulator 302 but other reflective spatial light modulators can be selected. Incident light from source 400 passes through incident light source optics 410 and enters polarization beam splitter 100'. When the light reaches the polarization beam splitter coated diagonal interface 113', light of one polarization passes through the beam splitter in a straight line and is incident on second reflective spatial light modulator 302. Light of the opposite polarization is reflected by the polarization beam splitter surface 113 and is again reflected by polarization beam splitter surface 114' into first modulator 300. As in the embodiment of FIG. 5A, a straight line indicates P-polarized light while a dashed line indicates S-polarized light. However, the opposite configuration can also be used (with P and S polarization light reversed) depending upon the selected beam splitter element.

Modulated light of the opposite polarization is reflected by each reflective spatial light modulator 300, 302. Light that exits reflective spatial light modulator 300 is incident on mirror surface 118 and is reflected towards a second set of projection optics 504. Similarly, light that exits reflective spatial light modulator 302 is also reflected by mirror surface 118 towards the first set of projection optics 502. In this manner, two modulated images are formed.

Depending upon the application, the modulated images can be the same or different. For the application of FIG. 6, it may be desirable to display the same image in two different locations and, optionally, two different sizes. For example, the main image display can be selected to be SVGA/XGA/720P/WSVGA resolution with a 0.3~0.4 inch active area; the smaller image projected from projection optics 404 can be of WVGA resolution with around a 0.2 inch active area. Alternatively, it may be desirable to display two different images on a single screen of the same image size and resolution that are "stitched together" to form a single wide screen image. Note that the projection screen can be a flat screen, a wall, a metal screen or any surface which can be projected upon.

While the foregoing invention has been described with respect to various embodiments, such embodiments are not limiting. Numerous variations and modifications would be understood by those of ordinary skill in the art. For example, the polarization beam splitters of the present invention can be employed in the image projection apparatus disclosed in U.S. patent application Ser. No. 13/233,036 incorporated by reference above. Such variations and modifications are considered to be included within the scope of the following claims.

The invention claimed is:

1. A polarization beam splitter comprising:
at least six prisms assembled together to form a single solid component consisting of a pair of substantially-orthogonal diagonal interfaces each formed by a combination of two or more prism surfaces;
wherein:
the solid component has at least four light entrance or exit surfaces, at least two of the light entrance or exit surfaces forming a step;
at least one prism has a non-triangular cross-sectional shape; and
at least one surface of a prism that forms a portion of an individual diagonal interface has a polarization beam splitting material disposed thereon.

2. The polarization beam splitter of claim 1, wherein at least two prisms have triangular cross sections and one angle of the triangular cross section is 90 degrees.

3. The polarization beam splitter of claim 2 wherein the triangular cross section has two different acute angles.

4. The polarization beam splitter of claim 1 further comprising a mirror material formed on at least a portion of the individual diagonal interface.

5. The polarization beam splitter of claim 1, wherein the material of the prisms is selected from glass, plastic, crystal or other optical materials.

6. The polarization beam splitter of claim 1 wherein four of the polarization beam splitter external surfaces are stepped surfaces.

7. The polarization beam splitter of claim 1 wherein two of the polarization beam splitter external surfaces are sloped surfaces.

8. The polarization beam splitter of claim 1, wherein the number of the light entrance or exit surfaces forming a step is two, and wherein non-stepped surfaces of the polarization beam splitter are substantially planar and intersect at approximately right angles with the stepped surfaces of the polarization beam splitter.

9. The polarization beam splitter of claim 1, at least one polarization coating or material is interposed between the prisms to enhance the contrast ratio.

10. The polarization beam splitter of claim 1, wherein the at least six prisms are cemented together to form a polarization beam splitter.

11. The polarization beam splitter of claim 1, wherein two or more prisms are cemented together to form a single cemented component and at least two cemented components form a polarization beam splitter.

12. An image projection system comprising:
the polarization beam splitter of claim 1;
at least one light source to provide light to the polarization beam splitter;
at least two image-forming panels positioned adjacent two sides of the polarization beam splitter to form images according to image input signals sent to each image-forming panel;
at least one projection lens group to project images outward from each of the at least two image-forming panels.

13. The image projection system of claim 12 wherein the light source and a first image-forming panel are positioned adjacent a first surface of the polarization beam splitter and a second image-forming panel is positioned adjacent a second polarization beam splitter surface facing the first surface.

14. An image projection system comprising:
the polarization beam splitter of claim 4;
at least one light source to provide light to the polarization beam splitter;
at least two image-forming panels positioned adjacent two sides of the polarization beam splitter to form images according to image input signals sent to each image-forming panel;

at least two projection lens groups to project images outward from each of the at least two image-forming panels.

15. The image projection system of claim 12 wherein the image input signals sent to each image-forming panel are selected such that the resulting image formed is a two dimensional image.

16. The image projection system of claim 12 wherein the image input signals sent to each image-forming panel are selected such that the resulting image formed is a three dimensional image.

\* \* \* \* \*